(12) United States Patent
Kim

(10) Patent No.: US 7,787,573 B2
(45) Date of Patent: Aug. 31, 2010

(54) WIRELESS SYSTEM HAVING CHANNEL FADING COMPENSATION USING MINIMUM MEAN SQUARE ERROR

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 906 days.

(21) Appl. No.: 11/093,035

(22) Filed: Mar. 30, 2005

(65) Prior Publication Data
US 2006/0109937 A1    May 25, 2006

Related U.S. Application Data

(60) Provisional application No. 60/629,323, filed on Nov. 19, 2004.

(51) Int. Cl.
*H04L 1/02* (2006.01)
(52) U.S. Cl. ...................... 375/347; 375/260
(58) Field of Classification Search .......... 375/347, 375/260, 346
See application file for complete search history.

(56) References Cited

U.S. PATENT DOCUMENTS

| | | | |
|---|---|---|---|
| 6,389,069 B1 * | 5/2002 | Mathe | 375/232 |
| 6,834,043 B1 * | 12/2004 | Vook et al. | 370/310 |
| 7,295,812 B2 | 11/2007 | Haapoja et al. | |
| 7,317,698 B2 * | 1/2008 | Jagger et al. | 370/328 |
| 2002/0122470 A1 | 9/2002 | Heikkila | |
| 2003/0144033 A1 * | 7/2003 | Sumasu et al. | 455/562 |
| 2004/0066866 A1 | 4/2004 | Tong et al. | |
| 2005/0018789 A1 | 1/2005 | Jia et al. | |
| 2005/0094598 A1 * | 5/2005 | Medvedev et al. | 370/329 |
| 2005/0135492 A1 | 6/2005 | Jia et al. | |
| 2006/0050770 A1 * | 3/2006 | Wallace et al. | 375/144 |
| 2007/0109954 A1 * | 5/2007 | Pasanen et al. | 370/204 |

OTHER PUBLICATIONS

Gore et al., "Transmit Selection in Spatial Miltiplexingsystems", Nov. 11, 2002, IEEE Communications Letter, vol. 6, No. 11.
Joonsuk Kim, "Wireless System Having Channel Fading Compensation Using Zero-Forcing", filed Mar. 30, 2005, U.S. Appl. No. 11/093,054.

* cited by examiner

*Primary Examiner*—Shuwang Liu
*Assistant Examiner*—David Huang
(74) *Attorney, Agent, or Firm*—Sterne, Kessler, Goldstein & Fox P.L.L.C.

(57) ABSTRACT

A MISO wireless LAN includes multiple inputs and a single output. The present invention includes a method and apparatus of compensating for time sensitive or frequency sensitive channel fading using minimum mean square error. The time sensitive channel fading is represented by the vector [H(t)], and the interference compensation is performed by multiplying the incoming data by a minimum mean square error factor that is determined as $[(H^* \cdot H + 1/SNR)^{-1} \cdot H^*]$. More specifically, the $H^*$ represents channel matching and $(H^* \cdot H + 1/SNR)^{-1}$ represents interference cancellation due to channel fading over time or frequency.

17 Claims, 5 Drawing Sheets

WIRELESS SYSTEM HAVING CHANNEL FADING COMPENSATION USING MINIMUM MEAN SQUARE ERROR

CROSS-REFERENCE TO RELATED APPLICATIONS

This application claim the benefit of U.S. Provisional Application Ser. No. 60/629,323, titled, "Wireless System Having Channel Fading Compensation Using Minimum Mean Square Error," incorporated herein by reference in its entirety.

BACKGROUND OF THE INVENTION

1. Field of the Invention

The present invention generally relates to a wireless local area (WLAN) network receiver with link fading compensation. More specifically, a WLAN receiver is configured to compensate for link fading over time and frequency when used in multiple input single output (MISO) WLAN network.

2. Background Art

Wireless systems can utilize multiple transmitters and one or more receivers. For example, wireless LANs can utilize multiple transmitters and a single receiver to increase diversity gain and overall signal-to-noise (SNR). This can be known at multiple input, single output (MISO). There is also multiple inputs, multiple outputs (MIMO) for a network having multiple receivers.

However, channel fading that varies over time and frequency, can reduce the benefits of diversity gain in a multiple transmitter system, and thereby lower the overall signal-to-noise ratio (SNR). Channel fading includes attenuation caused by multiple path and phase delay that can vary over time and frequency.

Therefore, what is needed is a system and method that compensates for link fading over time or frequency.

BRIEF SUMMARY OF THE INVENTION

A MISO wireless LAN includes multiple inputs and a single output. The present invention includes a method and apparatus of compensating for time sensitive or frequency sensitive channel fading using minimum mean square error (MMSE). The time sensitive channel fading is represented by the vector [H(t)], and the interference compensation is performed by multiplying by a minimum mean square error factor that is determined as [(H*·H+1/SNR)−1·H*]. More specifically, the H* represents channel matching and (H*·H+1/SNR)−1 represents interference cancellation due to channel fading over time or frequency.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
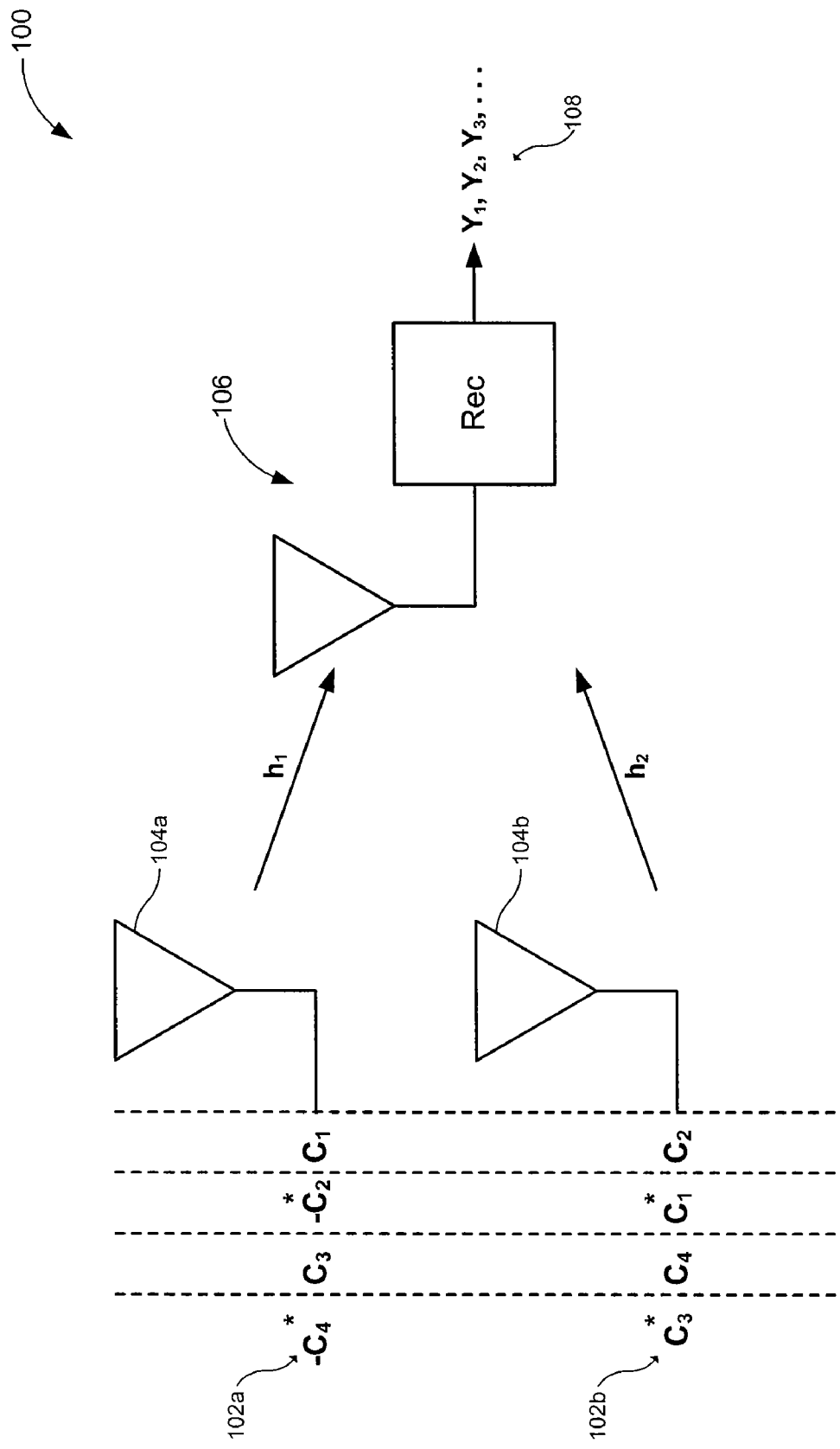
FIG. 1 is a block diagram of a conventional WLAN MISO system using STBC coding and conventional processing.

FIG. 1 is a block diagram of a MISO system 100 for a wireless LAN. MISO system 100 includes multiple transmitters 102a and 102b and a receiver 106. A single data stream 102 is divided into multiple data streams 102a and 102b for transmission over multiple paths h1 and h2 to the receiver 106. Over time, the stream 102 includes data symbols $C_1$, $C_2$, $C_3$, and $C_4$. As shown in the FIG. 1, diversity is achieved by transmitting stream 102a having data $C_1$, $-C_2^*$, $C_3$, $-C_4^*$ on transmitter 104a over path link h1, and by simultaneously transmitting stream 102b having data $C_2$, $C_1^*$, $C_4$, $C_3^*$ on path link h2. This coding scheme is known as Space Time Block Coding (STBC).

Receiver 106 recovers the data symbols $C_1$, $C_2$, $C_3$, and $C_4$. Receiver 106 generate signals $Y_1$, $Y_2$, $Y_3$, etc., based on the transmitted streams 102a and 102b. $Y_1$ and $Y_2$ are defined as:

$$Y_1 = h_1 C_1 + h_2 C_2 \tag{Eq. 1}$$

$$Y_2 = -h_1 C_2^* + h_2 C_1^* \tag{Eq. 2}$$

Data $C_1$ and $C_2$ are then recovered from $Y_1$ and $Y_2$. Data $C_3$ and $C_4$ can be recovered from $Y_3$ and $Y_4$. Processing of $Y_1$ and $Y_2$ are now described.

In order to simplify processing, $Y_1$ and $Y_2$ are processed in matrix form. In order to work in matrix form, the complex conjugate of $Y_2$ is taken as:

$$Y_2^* = h_2^* C_1 - h_1^* C_2 \tag{Eq. 3}$$

In matrix form, therefore:

$$\begin{bmatrix} Y_1 \\ Y_2^* \end{bmatrix} = \begin{bmatrix} h_1 & h_2 \\ h_2^* & -h_1^* \end{bmatrix} \cdot \begin{bmatrix} C_1 \\ C_2 \end{bmatrix} \tag{Eq. 4}$$

Defining the "h" matrix as H:

$$\begin{bmatrix} Y_1 \\ Y_2^* \end{bmatrix} = H \cdot \begin{bmatrix} C_1 \\ C_2 \end{bmatrix} \tag{Eq. 5}$$

H is determined from h1 and h2, from the preamble of each data stream. Accordingly, H represents the channel effect on the received data $Y_1$ and $Y_2$. Multiplying both sides of equation (5) by the complex conjugate of H yields:

$$H^* \begin{bmatrix} Y_1 \\ Y_2^* \end{bmatrix} = H^* \cdot H \begin{bmatrix} C_1 \\ C_2 \end{bmatrix} \tag{Eq. 6}$$

$$= \begin{bmatrix} |H_1|^2 + |H_2|^2 & 0 \\ 0 & |H_1|^2 + |H_2|^2 \end{bmatrix} \cdot \begin{bmatrix} C_1 \\ C_2 \end{bmatrix} \tag{Eq. 7}$$

Equations (4) and (5) represent the effects of link channel fading of the paths $h_1$ and $h_2$ on representative transmitted data $C_1$ and $C_2$ as seen at the resulting received data $Y_1\ Y_2$, where the vector [H] represents the channel fading effect. Channel fading includes channel attenuation etc. including channel attenuation caused by multi-path effects. In equations (6) and (7), the channel fading is compensated by multiplying by the vector [H*]. Specifically, it is noted in equation (7) that the vector diagonals are zero. The zero values for the vector diagonals reduce the complexity of the solution. However, this is only a static correction and does not compensate for dynamic variation in channel fading over time. In other words, multiplying by the vector [H*] does not correct for variations in $h_1$ and $h_2$ over time or frequency. In order to compensate for this, a minimum means square error function is used to compensate the incoming data.

Figure 2:
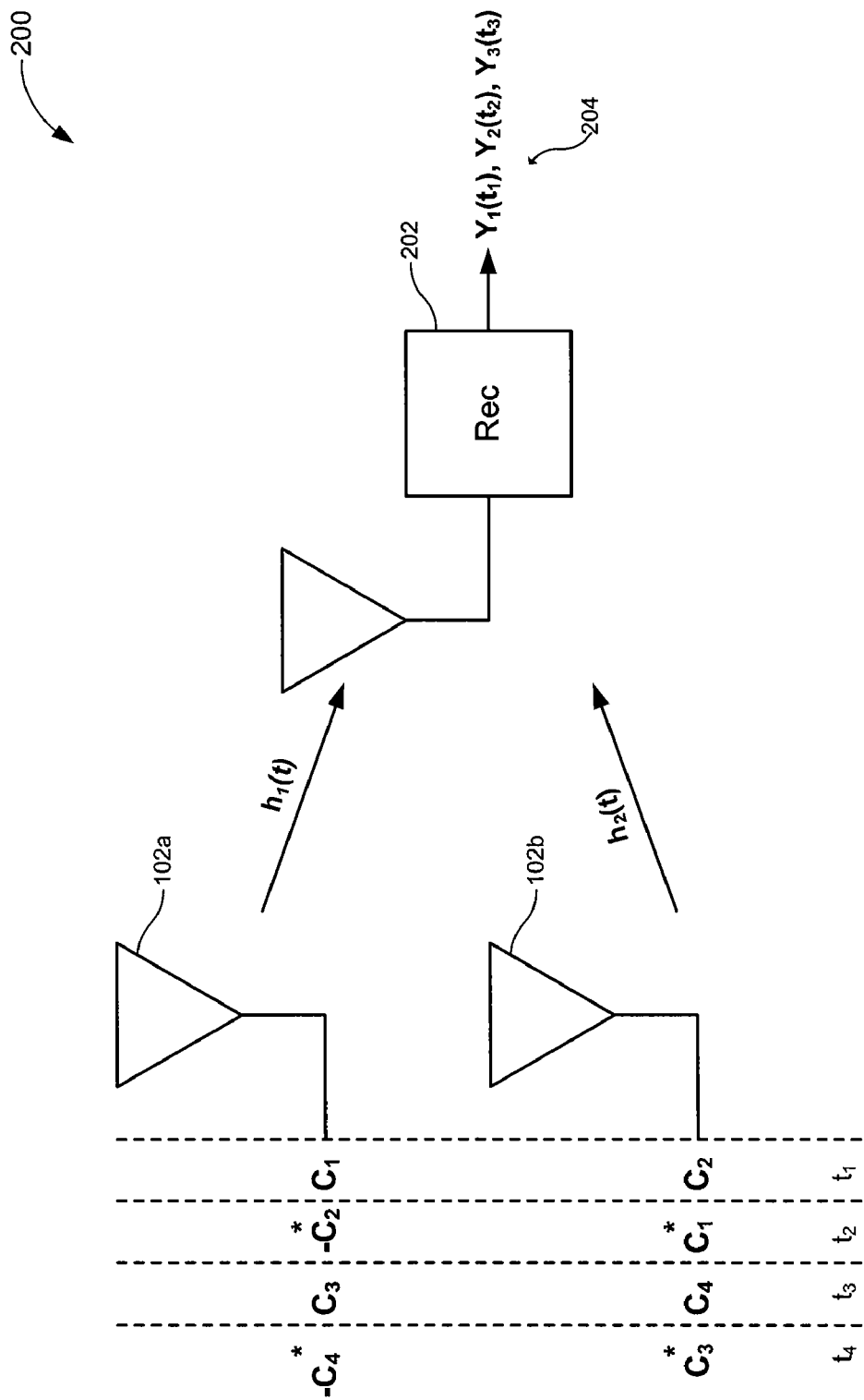
FIG. 2 is a block diagram of a WLAN MISO system using STBC coding having minimum mean square error compensation according to embodiments of the present invention.

FIG. 2 is a block diagram of a MISO system 200 for a wireless LAN. The MISO system 200 is similar to the MISO system 100, but the receiver 202 is configured to compensate for channel fading over time (e.g. $t_1$, $t_2$, $t_3$, etc.)

Equations 8, 9, and 10, below, are associated with the MISO system 200. Referring to equations 8 and 9, it can be seen that multiplying the received data by the vector [H*] alone, does not produce nulls in the diagonals of the vector in equation (9). Instead, as shown in equation (10), the time sensitive channel fading produces error terms ($\epsilon_1$ and $\epsilon_2$) along the diagonals of the vector in equation (10). In other words, $\epsilon_1$ and $\epsilon_2$ represent channel fading over time.

substantially to zero. Accordingly, the minimum mean square error factor [(H*·H+1/SNR)−1·H*] provides compensation for time varying fading.

The minimum mean square error factor is effective for, among other implementations, relatively lower signal to noise ratio systems. Alternatively, a zero forcing factor [(H*·H)·H*] is used for relatively higher signal to noise ratio systems, as described in co-pending concurrently filed application titled, "Wireless System Having Channel Fading Compensation Using Zero-Forcing," application Ser. No. 11/093, 035, incorporated herein by reference in its entirety.

Figure 3:
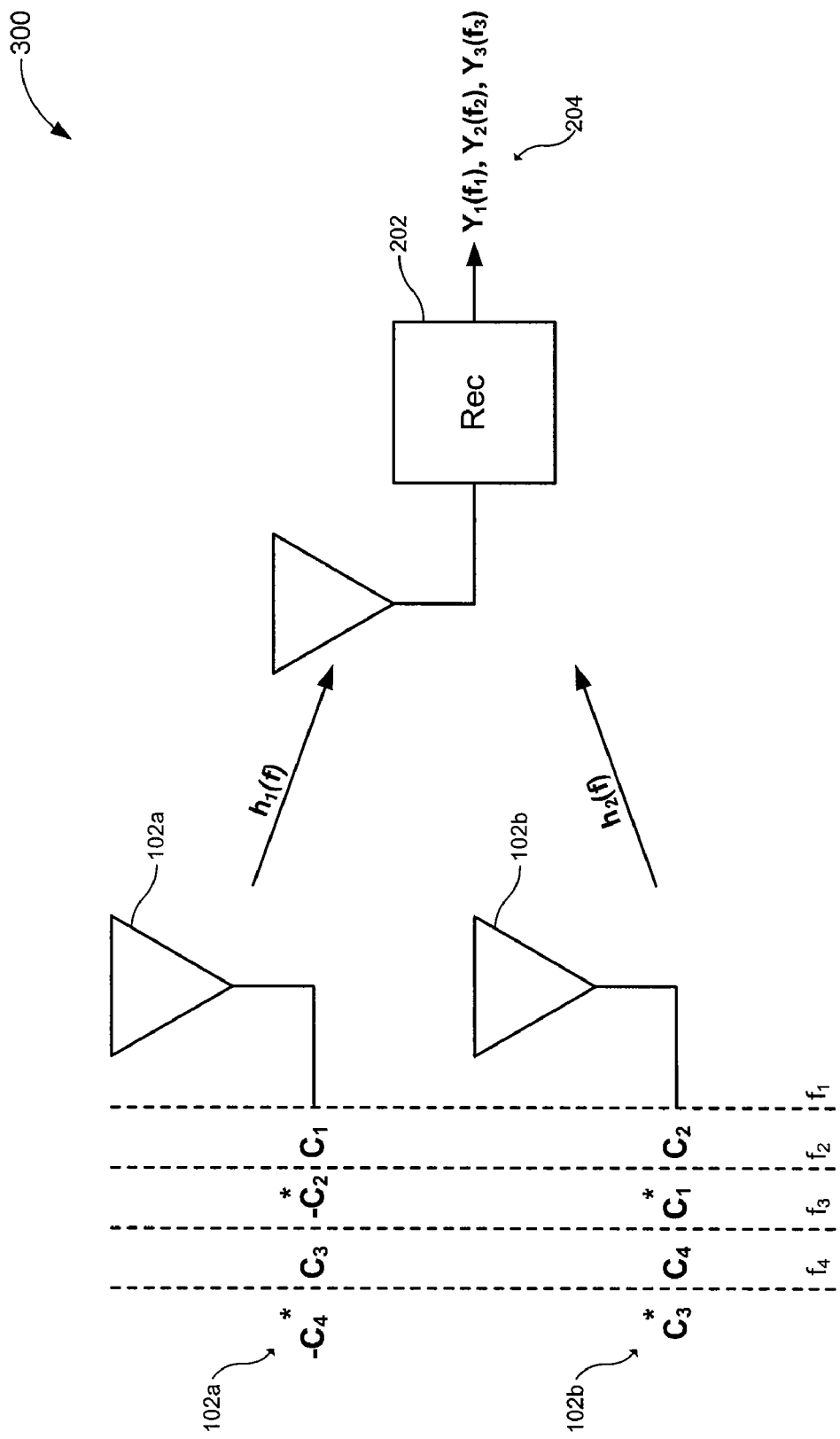
FIG. 3 illustrates space frequency block coding.

The minimum mean square error factor can also be used for frequency sensitive fading that occurs in Space Frequency Block Coding (SFBC). In other words, the transmitted data is varied over frequency as shown in FIG. 3, instead of time. Frequency sensitive fading occurs when multi-path effects vary over frequency, instead of over time. The minimum mean square error factor [(H*·H+1/SNR)−1·H*] can be used to compensate for frequency selective fading. H is defined in frequency domain in SFBC such as:

$$H = \begin{bmatrix} h_1(f_1) & h_2(f_1) \\ h_2^*(f_2) & -h_1^*(f_2) \end{bmatrix}$$

By using multiple receivers 202, the MISO system 200 can be converted to a MIMO system (multiple input, multiple $$\begin{bmatrix} Y_1 \\ Y_2^* \end{bmatrix} = \begin{bmatrix} h_1(t_1) & h_2(t_1) \\ h_2^*(t_2) & h_1^*(t_2) \end{bmatrix} \cdot \begin{bmatrix} C_1 \\ C_2 \end{bmatrix} \quad \text{(Eq. 8)}$$

$$H^*H \begin{bmatrix} C_1 \\ C_2 \end{bmatrix} = \begin{bmatrix} h_1^*(t_1)h_1(t_1) + h_2(t_2)h_2^*(t_2) & h_1^*(t_1)h_2(t_1) - h_2(t_2)h_1^*(t_2) \\ h_1(t_1)h_2(t_1) - h_1(t_2)h_2^*(t_2) & h_1^*(t_2)h_1(t_2) + h_2(t_1)h_2(t_1) \end{bmatrix} \cdot \begin{bmatrix} C_1 \\ C_2 \end{bmatrix} \quad \text{(Eq. 9)}$$

$$\begin{bmatrix} A_1 & \varepsilon_1 \\ \varepsilon_2 & A_2 \end{bmatrix} \cdot \begin{bmatrix} C_1 \\ C_2 \end{bmatrix} \text{ where} \quad \text{(Eq. 10)}$$

$$A_1 = h_1^*(t_1)h_1(t_1) + h_2(t_2)h_2^*(t_2), \text{ and}$$
$$A_1 = h_1^*(t_2)h_1(t_2) + h_2(t_1)h_2(t_1)$$

$$\left[\left(H^* \cdot H + \frac{1}{SNR}\right)^{-1} \cdot H^*\right] \cdot H(t) \cdot \begin{bmatrix} C_1 \\ C_2 \end{bmatrix} = \begin{bmatrix} C_1 + 0 \\ 0 + C_2 \end{bmatrix} \quad \text{(Eq. 11)}$$

$$\text{where } H = \begin{bmatrix} h_1(t_1) & h_2(t_1) \\ h_2^*(t_2) & -h_1^*(t_2) \end{bmatrix}$$

Accordingly, the receiver 200 is configured so that a minimum mean square error factor [(H*·H+1/SNR)−1·H*] is utilized to compensate the data for time sensitive fading. More specifically, the incoming data ($C_1$, $C_2$, etc.) is multiplied by the minimum mean square error factor [(H*·H+1/SNR)−1·H*], where H represents channel effects including channel fading over time. SNR is signal-to-noise ratio pf the incoming data stream $Y_1$, $Y_2$, etc. The reason for adding 1/SNR for interference cancellation in MMSE is to reduce noise enhancement when the absolute value of H is too small to boost the noise power during the process. If the absolute value of H is too small, 1/SNR gets too large to suppress the noise power when it is reversely multiplied. By doing so, as shown in equation 11, the diagonals of equation 11 are reduced substantially to zero, thereby reducing or eliminating the error term in the vector. In other words, the error terms $\epsilon_1$ and $\epsilon_2$, representing time sensitive channel fading, are reduced outputs). The time and frequency selective fading compensation described herein also applies to MIMO systems.

Figure 4:
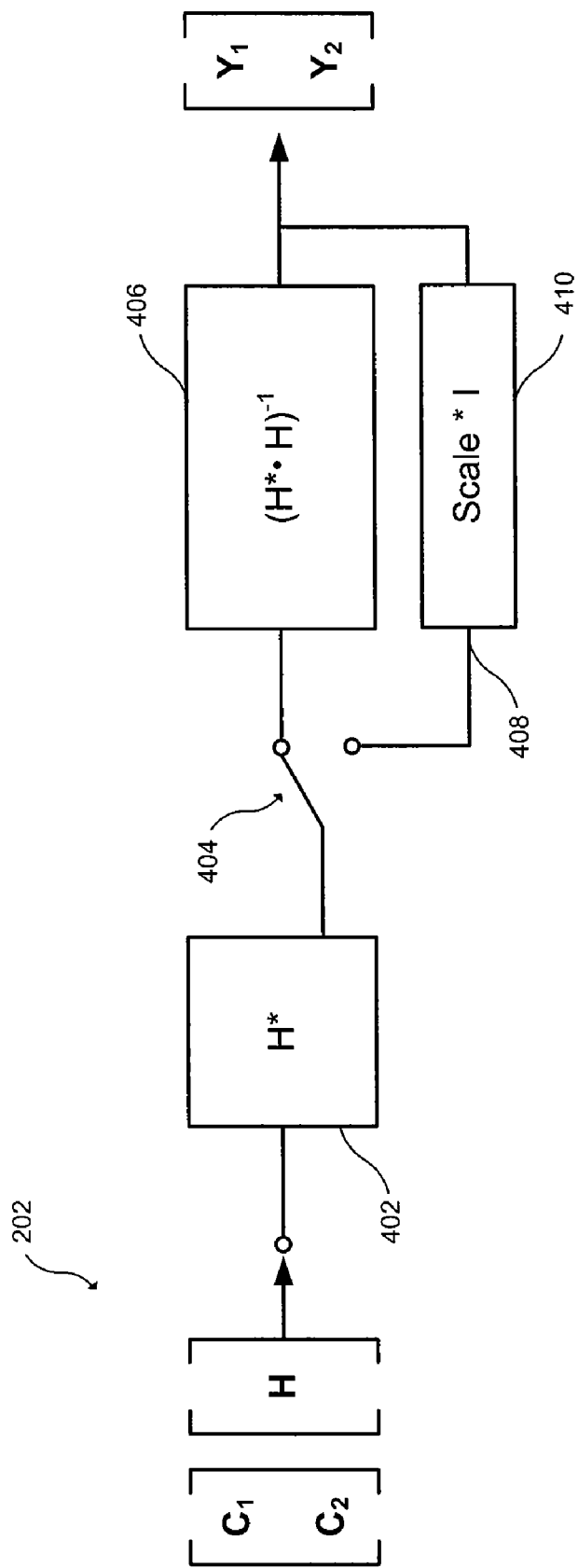
FIG. 4 illustrates minimum mean square error according to embodiments of the present invention.
Figure 5:
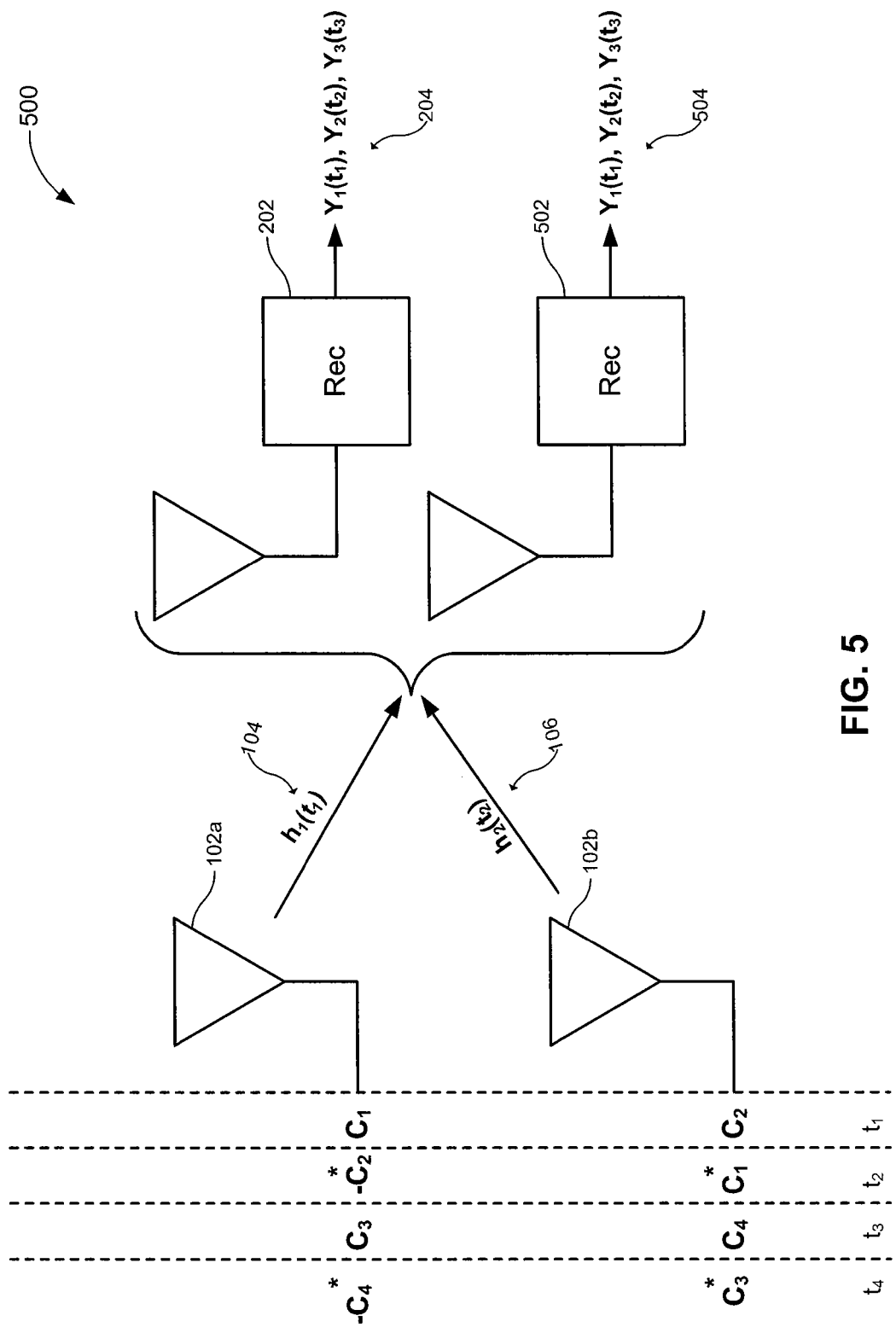
FIG. 5 is a block diagram of a WLAN MIMO system using STBC coding having a minimum mean square factor for compensation according to embodiments of the present invention.

FIG. 4 further illustrates the receiver 202 having minimum mean square error compensation for channel fading. The minimum mean square error can represented as multiplying the incoming data by vector [H*] 402 for channel matching, and then multiplying by [(H*·H+1/SNR)$^{-1}$] 406 for interference cancellation due to channel fading over time or frequency. The minimum mean square error can be bypassed by closing the switch 404 to the lower path 408 when there is little or no channel fading over time. This can be utilized to reduce signal processing requirements, thus reducing use of battery power and/or processing delay time.

In the example of FIG. 4, the lower path 408 includes a scale*I module 410, which optionally provides a constant scaling factor for unity gain. I is an M×M matrix, where M is the number of transmit antennas.

In embodiments, the present invention of minimum mean square error compensation is utilized in wireless LANs that operate according to IEEE std. 802.11g and/or IEEE std. 802.11n, as well as other standards. The mentioned standards are incorporated herein by reference.

The representative signal processing functions described herein can be implemented in hardware, software, firmware, and/or combinations thereof. For example, the signal processing functions can be implemented using computer processors, computer logic, application specific circuits (ASIC), digital signal processors, etc., as will be understood by those skilled in the arts based on the discussion given herein. Accordingly, any processor that performs the signal processing functions described herein is within the scope and spirit of the present invention.

Further, the signal processing functions described herein can be embodied by computer program instructions that are executed by a computer processor or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A method for processing a diversity signal transmitted over a plurality of time-sensitive channel fading communication links, comprising:

receiving a first data stream transmitted over a first time-sensitive communication link during a first time period ($t_1$) and a second data stream transmitted over a second time-sensitive communication link during a second time period ($t_2$), wherein the first and second data streams correspond to the transmit-diversity signal;

multiplying said received first and second data streams by a mean square error $[(H^* \cdot H + 1/SNR)^{-1} \cdot H^*]$, wherein H represents channel effects on the received first and second data streams and is represented by $$H = \begin{bmatrix} h_1(t_1) & h_2(t_1) \\ h_2^*(t_2) & -h_1^*(t_2) \end{bmatrix},$$

where
$h_1(t_1)$ represents time-sensitive channel fading in the first communication link ($h_1$) during the first time period ($t_1$), $h_2(t_1)$ represents time-sensitive channel fading in the second communication link ($h_2$) during the first time period ($t_1$), $h_2^*(t_2)$ is a complex conjugate of $h_2(t_2)$, which represents time-sensitive channel fading in the second communication link ($h_2$) during the second time period ($t_2$), and $-h_1^*(t_2)$ is a negative complex conjugate of $h_1(t_2)$, which represents time-sensitive channel fading in the first communication link ($h_1$) during the second time period ($t_2$); and bypassing multiplication by the mean square error when substantially zero time-sensitive channel fading is present on the plurality of communication links.

2. The method according to claim 1, wherein said receiving comprises:

receiving data symbols through a first channel, wherein the data symbols are separated in time;

determining $h_1$ and an associated first channel noise figure from a preamble of the data symbols received through the first channel;

receiving the data symbols through a second channel, wherein the data symbols are separated in time;

determining $h_2$ and an associated second channel noise figure from the preamble of the data symbols received through the second channel;

determining an overall channel characteristic H from $h_1$ and $h_2$; and determining a signal-to-noise ratio from the first and second noise figures.

3. The method according to claim 2, wherein said receiving comprises:

receiving a first data symbol $C_1$ through the first channel;

receiving a second data symbol $C_2$ through the second channel;

receiving the negative complex conjugate of the second data symbol $C_2$ through the first channel;

receiving the complex conjugate of the first data symbol $C_1$ through the second channel; and generating $Y_1 = h_1 C_1 + h_2 C_2$ $Y_2 = -h_1 C_2^* + h_2 C_1^*$ $Y_2^* = h_2^* C_1 - h_1^* C_2;$ wherein $$\begin{bmatrix} Y_1 \\ Y_2^* \end{bmatrix} = \begin{bmatrix} h_1(t_1) & h_2(t_1) \\ h_2^*(t_2) & -h_1^*(t_2) \end{bmatrix} \cdot \begin{bmatrix} C_1 \\ C_2 \end{bmatrix}.$$

4. The method according to claim 3, wherein said multiplying comprises:

multiplying $Y_1$ and $Y_2^*$ by the mean square error $[(H^* \cdot H + 1/SNR)^{-1} \cdot H^*]$, where $$H = \begin{bmatrix} h_1(t_1) & h_2(t_1) \\ h_2^*(t_2) & -h_1^*(t_2) \end{bmatrix}$$

and $H^*$ is the complex conjugate of H.

5. The method of claim 1, wherein bypassing multiplication by the mean square error comprises multiplying the data stream by a constant scaling factor for unity gain.

6. A method for processing a diversity signal transmitted over a plurality of frequency-sensitive channel fading communication links, comprising:
  receiving a first data stream transmitted over a first frequency-sensitive communication link in a first frequency range ($f_1$) and a second data stream transmitted over a second frequency-sensitive communication link in a second frequency range ($f_2$), wherein the first and second data streams correspond to the transmit-diversity signal;
  multiplying said received first and second data streams by a mean square error [(H*·H+1/SNR)$^{-1}$·H*], wherein H represents channel effects on the received first and second data streams and is represented by $$H = \begin{bmatrix} h_1(f_1) & h_2(f_1) \\ h_2^*(f_2) & -h_1^*(f_2) \end{bmatrix},$$

where
    $h_1(f_1)$ represents frequency-sensitive channel fading in the first communication link ($h_1$) over the first frequency range ($f_1$),
    $h_2(f_1)$ represents frequency-sensitive channel fading in the second communication link ($h_2$) over the first frequency range ($f_1$),
    $h_2^*(f_2)$ is a complex conjugate of $h_2(f_2)$, which represents frequency-sensitive channel fading in the second communication link ($h_2$) over the second frequency range ($f_2$), and
    $-h_1^*(f_2)$ is a negative complex conjugate of $h_1(f_2)$, which represents frequency-sensitive channel fading in the first communication link ($h_1$) over the second frequency range ($f_2$); and
  bypassing multiplication by the mean square error when substantially zero frequency-sensitive channel fading is present on the plurality of communication links.

7. The method according to claim 6, wherein said receiving comprises:
  receiving data symbols spread out over multiple frequencies through a first channel;
  determining $h_1$ and an associated first channel noise figure from a preamble of the data symbols received through the first channel;
  receiving the data symbols spread out over multiple frequencies through a second channel;
  determining $h_2$ and an associated second channel noise figure from the preamble of the data symbols received through the second channel;
  determining an overall channel characteristic H from $h_1$ and $h_2$; and
  determining a signal-to-noise ratio from the first and second noise figures.

8. The method according to claim 7, wherein said receiving comprises:
  receiving a first data symbol $C_1$ through the first channel;
  receiving a second data symbol $C_2$ through the second channel;
  receiving the negative complex conjugate of the second data symbol C2 through the first channel;
  receiving the complex conjugate of the first data symbol $C_1$ through the second channel; and
  generating $Y_1 = h_1 C_1 + h_2 C_2$ $Y_2 = -h_1 C_2^* + h_2 C_1^*$ $Y_2^* = h_2^* C_1 - h_1^* C_2;$ wherein $$\begin{bmatrix} Y_1 \\ Y_2^* \end{bmatrix} = \begin{bmatrix} h_1(t_1) & h_2(t_1) \\ h_2^*(t_2) & -h_1^*(t_2) \end{bmatrix} \cdot \begin{bmatrix} C_1 \\ C_2 \end{bmatrix}.$$

9. The method according to claim 8, wherein said multiplying comprises multiplying $Y_1$ and $Y_2$* by the mean square error [(H*·H +1/SNR)$^{-1}$·H*], wherein $$H = \begin{bmatrix} h_1(f_1) & h_2(f_1) \\ h_2^*(f_2) & -h_1^*(f_2) \end{bmatrix}$$

and H* is the complex conjugate of H.

10. A local area network receiver configured to process a diversity signal, comprising:
  means for receiving a first data stream transmitted over a first time-sensitive communication link during a first time period ($t_1$) and a second data steam transmitted over a second time-sensitive communication link during a second time period ($t_2$), wherein the first and second data streams correspond to the transmit-diversity signal;
  means for multiplying said received data stream by a mean square error [(H*·H+1/SNR)$^{-1}$·H*], wherein H represents channel effects on the received first and second data streams and H is represented by $$H = \begin{bmatrix} h_1(t_1) & h_2(t_1) \\ h_2^*(t_2) & -h_1^*(t_2) \end{bmatrix},$$

where
    $h_1(t_1)$ represents time-sensitive channel fading in the first communication link ($h_1$) during the first time period ($t_1$),
    $h_2(t_1)$ represents time-sensitive channel fading in the second communication link ($h_2$) during the first time period ($t_1$),
    $h_2^*(t_2)$ is a complex conjugate of $h_2(t_2)$, which represents time-sensitive channel fading in the second communication link ($h_2$) during the second time period ($t_2$), and
    $-h_1^*(t_2)$ is a negative complex conjugate of $h_1(t_2)$, which represents time-sensitive channel fading in the first communication link ($h_1$) during the second time period ($t_2$); and
  means for bypassing multiplication by the mean square error when substantially zero time-sensitive channel fading is present on the plurality of communication links.

11. The local area network receiver according to claim 10, wherein said means for receiving comprises:
  a first antenna that receives data symbols from a first channel, wherein the data symbols are separated in time;
  means for determining $h_1$ and an associated first channel noise figure from a preamble of the data symbols received through the first channel;
  a second antenna that receives the data symbols from a second channel, wherein the data symbols are separated in time;

means for determining $h_2$ and an associated second channel noise figure from the preamble of the data symbols received through the second channel;

means for determining an overall channel characteristic H from $h_1$ and $h_2$; and means for determining a signal-to-noise ratio from the first and second noise figures.

12. The local area network receiver according to claim 11, wherein:

said first antenna receives a first data symbol $C_1$ and a negative complex conjugate of a second data symbol $C_2$ through the first channel;

said second antenna receives a second data symbol $C_2$ and the complex conjugate of the first data symbol $C_1$ through the second channel;

and wherein said means for receiving comprises means for generating $$Y_1 = h_1 C_1 + h_2 C_2$$

$$Y_2 = -h_1 C_2^* + h_2 C_1^*$$

$$Y_2^* = h_2^* C_1 - h_1^* C_2;$$

wherein $$\begin{bmatrix} Y_1 \\ Y_2^* \end{bmatrix} = \begin{bmatrix} h_1(t_1) & h_2(t_1) \\ h_2^*(t_2) & -h_1^*(t_2) \end{bmatrix} \cdot \begin{bmatrix} C_1 \\ C_2 \end{bmatrix}.$$

13. The local area network receiver according to claim 12, wherein said means for multiplying comprises means for multiplying $Y_1$ and $y_2^*$ by the mean square error $[(H^* \cdot H + 1/SNR)^{-1} \cdot H^*]$.

14. A local area network receiver configured to process a diversity signal, comprising:

means for receiving a first data stream transmitted over a frequency-sensitive communication link in a first frequency range ($f_1$) and a second data stream transmitted over a second frequency-sensitive communication link in a second frequency range ($f_2$), wherein the first and second data streams correspond to the transmit-diversity signal;

means for multiplying said received first and second data streams by a mean square error $[(H^* \cdot H + 1/SNR)^{-1} \cdot H^*]$, wherein H represents channel effects on the received first and second data streams and is represented by $$H = \begin{bmatrix} h_1(f_1) & h_2(f_1) \\ h_2^*(f_2) & -h_1^*(f_2) \end{bmatrix},$$

where $h_1(f_1)$ represents frequency-sensitive channel fading in the first communication link ($h_1$) over the first frequency range ($f_1$), $h_2(f_1)$ represents frequency-sensitive channel fading in the second communication link ($h_2$) over the first frequency range ($f_1$), $h_2^*(f_2)$ is a complex conjugate of $h_2(f_2)$, which represents frequency-sensitive channel fading in the second communication link ($h_2$) over the second frequency range ($f_2$), and $-h_2^*(f_2)$ is a negative complex conjugate of $h_1(f_2)$, which represents frequency-sensitive channel fading in the first communication link ($h_1$) over the second frequency range ($f_2$); and means for bypassing multiplication by the mean square error when substantially zero frequency-sensitive channel fading is present on the plurality of communication links.

15. The local area network receiver according to claim 14, wherein said means for receiving comprises:

a first antenna that receives data symbols from a first channel, wherein the data symbols are separated in frequency;

means for determining $h_1$ and an associated first channel noise figure from a preamble of the data symbols received through the first channel;

a second antenna that receives the data symbols from a second channel, wherein the data symbols are separated in frequency;

means for determining a second channel characteristic $h_2$ and an associated second channel noise figure from the preamble of the data symbols received through the second channel;

means for determining an overall channel characteristic H from $h_1$ and $h_2$; and means for determining a signal-to-noise ratio from the first and second noise figures.

16. The local area network receiver according to claim 15, wherein:

said first antenna receives a first data symbol $C_1$ and a negative complex conjugate of a second data symbol $C_2$ through the first channel;

said second antenna receives a second data symbol $C_2$ and the complex conjugate of the first data symbol $C_1$ through the second channel;

and wherein said means for receiving comprises means for generating $$Y_1 = h_1 C_1 + h_2 C_2$$

$$Y_2 = -h_1 C_2^* + h_2 C_1^*$$

$$Y_2^* = h_2^* C_1 - h_1^* C_2;$$

wherein $$\begin{bmatrix} Y_1 \\ Y_2^* \end{bmatrix} = \begin{bmatrix} h_1(f_1) & h_2(f_1) \\ h_2^*(f_2) & -h_1^*(f_2) \end{bmatrix} \cdot \begin{bmatrix} C_1 \\ C_2 \end{bmatrix}.$$

17. The local area network receiver according to claim 16, wherein said means for multiplying comprises means for multiplying $Y_1$ and $Y_2^*$ by the mean square error $[(H^* \cdot H + 1/SNR)^{-1} \cdot H^*]$.

* * * * *

UNITED STATES PATENT AND TRADEMARK OFFICE
CERTIFICATE OF CORRECTION

PATENT NO. : 7,787,573 B2
APPLICATION NO. : 11/093035
DATED : August 31, 2010
INVENTOR(S) : Joonsuk Kim It is certified that error appears in the above-identified patent and that said Letters Patent is hereby corrected as shown below:

Title Page
Item (56), column 2, under "Other Publications", line 1, please replace "Miltiplexingsystems" with --Multiplexing systems--.

Column 3
Below "Eq. 10", after "and" please replace "$A_1=h_1^*(t_2)h_1(t_2)$" with --$A_2=h_1^*(t_2)h_1(t_2)$--.

Column 3
Line 56, please replace "pf" with --of--.

Column 7
Line 61, please replace "C2" with --$C_2$--.

Column 8
Lines 5-8, please replace "$\begin{bmatrix} Y_1 \\ Y_2^* \end{bmatrix} = \begin{bmatrix} h_1(t_1) & h_2(t_1) \\ h_2^*(t_2) & -h_1^*(t_2) \end{bmatrix} \cdot \begin{bmatrix} C_1 \\ C_2 \end{bmatrix}$" with --$\begin{bmatrix} Y_1 \\ Y_2^* \end{bmatrix} = \begin{bmatrix} h_1(f_1) & h_2(f_1) \\ h_2^*(f_2) & -h_1^*(f_2) \end{bmatrix} \cdot \begin{bmatrix} C_1 \\ C_2 \end{bmatrix}$--.

Column 9
Line 32, please replace "$y_2^*$" with --$Y_2^*$--.

Column 10
Line 5, please replace "-$h_2^*(f_2)$" with "-$h_1^*(f_2)$".

Signed and Sealed this
Seventh Day of February, 2012

David J. Kappos
*Director of the United States Patent and Trademark Office*